United States Patent [19]
Mizuno et al.

[11] Patent Number: 5,343,307
[45] Date of Patent: Aug. 30, 1994

[54] ON-SCREEN DISPLAY APPARATUS

[75] Inventors: Takao Mizuno, Takatsuki; Michihiro Fujiyama, Daito, both of Japan

[73] Assignee: Sanyo Electric Co., Ltd., Moriguchi, Japan

[21] Appl. No.: 904,700

[22] Filed: Jun. 26, 1992

[30] Foreign Application Priority Data

Jun. 28, 1991 [JP] Japan .............................. 3-158986

[51] Int. Cl.5 ........................................... H04N 5/445
[52] U.S. Cl. ................... 358/444; 340/825.44; 358/445; 358/446
[58] Field of Search ............... 358/444, 445, 446; 364/926.3, 947; 315/365; 382/9, 44, 48; 10, 13, 67; 345/26, 129, 141, 193, 195, 1, 201; 395/275, 153

[56] References Cited

U.S. PATENT DOCUMENTS

| | | | |
|---|---|---|---|
| 3,786,482 | 1/1974 | Puckett, Jr. et al. | 340/324 A |
| 4,079,458 | 3/1978 | Rider et al. | 364/900 |
| 4,120,049 | 10/1978 | Thaler et al. | 365/230 |
| 4,122,443 | 10/1978 | Thaler et al. | 340/146.321 |
| 4,156,238 | 5/1979 | Glasson et al. | 340/749 |
| 4,837,729 | 6/1989 | Funahashi | 364/900 |
| 4,849,747 | 7/1989 | Ogawa et al. | 340/735 |
| 4,924,410 | 5/1990 | Hamada | 364/518 |
| 5,084,820 | 1/1992 | Nagaya et al. | 364/419 |
| 5,093,868 | 3/1992 | Tanaka et al. | 382/9 |
| 5,107,259 | 4/1992 | Weitzen et al. | 340/825.44 |

*Primary Examiner*—Paul Ip
*Attorney, Agent, or Firm*—Armstrong, Westerman, Hattori, McLeland & Naughton

[57] ABSTRACT

An on-screen display apparatus includes a CPU (14), a display RAM (26), and a line ROM (28). Character codes of characters constituting each sentences are stored in a series of addresses of the line ROM and, when a given sentence is to be displayed, a head address of a series of addresses is written in the display RAM by the CPU. A decoder (30) sequentially and automatically reads the character codes from address beginning at the head address at every predetermined timings by referring position data of display positions on a screen of a monitor television (54) from a count circuit (48). Therefore, font data of the characters constituting that sentence are sequentially outputted from a character ROM (32) to be displayed on the monitor television in a manner that the character is superposed on a television video signal.

3 Claims, 7 Drawing Sheets

FIG. 2

DISPLAY RAM 26

| BIT ADR. | DAF | DAE | DAD | DAC | DAB | DAA | DA9 | DA8 | DA7 | DA6 | DA5 | DA4 | DA3 | DA2 | DA1 | DA0 |
|---|---|---|---|---|---|---|---|---|---|---|---|---|---|---|---|---|
| 000h | 0 | 0 | 0 | 0 | 0 | 0 | 0 | 0 | BLINK | 0 | C5 | C4 | C3 | C2 | C1 | C0 |
| | | | | | | | | | BLINK | | | CHARACTER CODE | | | | |
| 0AFh | 0 | 0 | 0 | 0 | 0 | 0 | 0 | 0 | BLINK | 0 | C5 | C4 | C3 | C2 | C1 | C0 |
| 0B0h | 0 | 0 | 0 | 0 | — | ADRA | ADR9 | ADR8 | ADR7 | ADR6 | ADR5 | ADR4 | ADR3 | ADR2 | ADR1 | ADR0 |
| 0BBh | 0 | 0 | 0 | 0 | — | ADRA | ADR9 | ADR8 | ADR7 | ADR6 | ADR5 | ADR4 | ADR3 | ADR2 | ADR1 | ADR0 |
| 0BCh | 0 | 0 | 0 | 0 | | | | | | | | | | | | |
| 0BDh | 0 | 0 | 0 | 0 | | | | | | | | | | | | |
| 0BEh | 0 | 0 | 0 | 0 | | | | | | | | | | | | |
| 0BFh | 0 | 0 | 0 | 0 | | | | | | | | | | | | |

FIG. 3

LINE ROM 28

| HEAD ADR | 00 01 02 03 04 05 06 07 08 09 0A 0B 0C 0D 0E 0F 10 11 12 13 14 15 16 17 | CHAR-ACTER ADR | CHAR-ACTER ADR |
|---|---|---|---|
| 00 | USH□NUMBER□TO□SELECT□□□ | 00 | |
| 18 | MPUJE□NUMERO□DESEADO□□□□ | 18 | |
| 30 | MPUJE□OTROS□NUMEROS□□□□ | 30 | |
| 48 | USH□PROGRAM□TO□QUIT□□□□ | 48 | |
| 60 | MPUJE□CLEAR□P.□CORREJIR | 60 | |
| 78 | MPUJE□PROGRAM□P.□ACABAR | 78 | |
| 90 | ORMAL=?□SEM.=?□DIARIO=? | 90 | |
| A8 | RESSER□CHIFFRE=□CHOISIR | A8 | |
| C0 | MPUJE□CLEAR□P.□ACLARAR□ | C0 | |
| D8 | ORMAL=?□WKLY=?□DAILY=?□ | D8 | |
| F0 | RESSER□PROGRAM=□SORTIR□ | F0 | |
| 108 | ROGRAMAR□RELOJ□□#?????? | 108 | |
| 120 | ROGRAMME□□□□□□NO□※????? | 120 | 132 |
| 138 | ???????????????????USH□C | 14A | |
| 150 | LEAR□TO□ERASE□※□□□?MES/? | 15E | |
| 168 | DIA/?ANO□□□□□□※RESSER□CL | 176 | |
| 180 | EAR=□CHANGER□※CHANNEL□?? | 18D | |
| 198 | ???□SPEED□??※START□□□□?? | 1A4 | |
| 1B0 | /??(???)□□□□※RESSER□CLEA | 1BC | |
| 1C8 | R=□EFFACER□※NORMAL=?□HEB | 1D3 | |
| 1E0 | D=?□QUOT=?※EN□TIME□?:? | 1EA | |
| 1F8 | ?□??□※□□□□?MONTH/?DAY/?Y | 1FD | |
| 210 | EAR□□※RESSER□AUTRE□CHIFF | 215 | |
| 228 | RE□□※FIN□HEURE??:??□??□※ | 22C | 23F |
| 240 | □□□□?MOIS/?JOUR/?ANNEE□※ | 257 | |
| 258 | USH□CLEAR□TO□CORRECT※□□3 | 26C | |
| 270 | .□PROGRAM□※HECK/CLEAR□□□N | 279 | |
| 288 | O.?□※□□□□AM=?□PM=??□□□□※ | 28C | 29F |
| 2A0 | □□□□SP=?□LP=?□EP=?※□□□□S | 2B2 | |
| 2B8 | P=?□EP=??□□□□※□□□□SC=?□A | 2C5 | |
| 2D0 | /V=??□□□※□□□□DATE□??/??/ | 2D8 | |
| 2E8 | ??(???)□※USH□PROGRAM□TO□ | 2F1 | |

FIG. 4

LINE ROM 28

| HEAD ADR | 00 01 02 03 04 05 06 07 08 09 0A 0B 0C 0D 0E 0F 10 11 12 13 14 15 16 17 | CHARACTER ADR | CHARACTER ADR |
|---|---|---|---|
| 300 | E N D ■ □ □ □ □ M O D O □ ? ? ? ? ? ? □ □ □ ■ □ | 303 | 316 |
| 318 | □ □ □ M O D E □ ? ? ? ? ? □ □ □ ■ □ □ □ □ ? M | 329 | |
| 330 | O N T H / ? D A Y □ □ □ ■ □ □ □ □ ? M E S / ? D | 33C | |
| 348 | I A □ □ □ □ □ ■ □ □ □ □ ? M O I S / ? J O U R □ | 34F | |
| 360 | □ □ □ □ ■ □ □ ? ? / ? ? ( ? ? ? ) □ ? ? : ? ? ? | 364 | |
| 378 | ? ■ □ □ C A N A L □ ? ? ? ? ? □ V I T E S . ? ? | 379 | |
| 390 | □ ■ U S H □ O T H E R □ N U M B E R S □ □ ■ □ □ | 391 | 3A5 |
| 3A8 | □ O F F □ T I M E □ ? ? : ? ? □ ? ? □ □ ■ T E R | 3BC | |
| 3C0 | M I N A R □ ? ? : ? ? □ ? ? □ □ ■ □ □ □ O N □ □ | 3D0 | |
| 3D8 | T I M E □ ? ? : ? ? □ ? ? □ □ □ ■ E R I F / E F | 3E8 | |
| 3F0 | F A C E R □ N O □ ? □ □ □ ■ □ □ 1 . ■ L O C K □ | 3FD | 402 |
| 408 | S E T T I N G □ □ □ □ □ □ □ □ ■ □ □ 1 . ■ O L O | 417 | 41C |
| 420 | C A R □ R E L O J □ □ □ □ □ □ □ □ ■ □ □ 1 . ■ 1 | 431 | 436 |
| 438 | S E □ A □ L ' H E U R E □ □ □ □ □ □ ■ □ □ 3 . | 44B | |
| 450 | V E R I F I E R / E F F A C E R ■ □ □ 2 . P R O | 460 | |
| 468 | G R A M M A T I O N □ □ □ ■ □ □ 2 . T I M E R □ | 475 | |
| 480 | S E T T I N G □ □ □ ■ □ □ 2 . P R O G R A M A R | 48A | |
| 498 | □ R E L O J □ ■ □ □ 0 . E N G L I S H □ □ □ □ □ | 49F | |
| 4B0 | □ □ □ □ ■ □ □ 0 . E S P A N O L □ □ □ □ □ □ □ | 4B4 | |
| 4C8 | □ ■ □ □ 0 . F R A N C A I S □ □ □ □ □ □ □ □ □ | 4C9 | |
| 4E0 | □ ■ I M E R □ S E T T I N G □ □ N O . ? ? ? ■ ? | 4E1 | 4F6 |
| 4F8 | ? ■ □ □ □ □ □ □ □ □ □ □ □ □ □ ■ □ □ □ □ □ □ □ □ | 4F9 | 506 |
| 510 | □ Q T R □ □ □ ■ □ □ □ □ □ □ M E N U □ □ □ □ □ □ | 514 | |
| 528 | ■ □ □ □ □ H E U R E ? ? : ? ? □ ? ? □ ■ □ □ □ □ | 528 | 53B |
| 540 | H O R A □ ? ? : ? ? □ ? ? □ ■ □ □ □ □ T I M E □ | 54E | |
| 558 | ? ? : ? ? □ ? ? □ ■ □ □ □ □ J O U R □ ? ? / ? ? | 561 | |
| 570 | / ? ? ( ? ? ? ) □ ■ H E Q U E A R / A C L A R A | 579 | |
| 588 | R # ? □ □ □ ■ □ □ 3 . V E R I F I C A R □ P R O | 58E | |
| 5A0 | G R A M A ■ D E B U T □ □ □ □ ? ? / ? ? ( ? ? ? | 5A5 | |
| 5B8 | ) □ □ □ ■ E M P E Z A R □ □ ? ? / ? ? ( ? ? ? ) | 5BC | |
| 5D0 | ■ □ □ □ F E C H A □ ? ? / ? ? / ? ? ( ? ? ? ) ■ | 5D0 | 5E7 |
| 5E8 | □ C A N A L □ ? ? ? ? ? □ R A P I D E Z □ ? ? □ | | |

| UPPER (HEX) | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 00 | 0 | 1 | 2 | 3 | 4 | 5 | 6 | 7 | 8 | 9 | − | : | / | . | , | ˙ |
| 10 | A | B | C | D | E | F | G | H | I | J | K | L | M | N | O | P |
| 20 | Q | R | S | T | U | V | W | X | Y | Z | [ | ] | ( | ) | ; | |
| 30 | ③ | ㉒ | ④ | Ⓔ | _ | + | * | = | # | ※ | ↑ | ↓ | ← | → | ? | |

LOWER (HEX)

FIG. 7

| LINE NO. | LINE ROM ADR | |
|---|---|---|
| 1 | 515 | MENU |
| 2 | 3EB | 1. CLOCK SETTING |
| 3 | 463 | 2. TIMER SETTING |
| 4 | 25A | 3. PROGRAM CHECK/CLEAR |
| 5 | 4F9 | |
| 6 | 4F9 | |
| 7 | 4F7 | 0. FRANCAIS |
| 8 | 00 | PUSH NUMBER TO SELECT |
| 9 | 48 | PUSH PROGRAM TO QUIT |
| 10 | 4F9 | |

FIG. 8

| LINE NO. | LINE ROM ADR | |
|---|---|---|
| 1 | 402 | CLOCK SETTING |
| 2 | 4F9 | |
| 3 | 54E | TIME 12:00AM |
| 4 | 4F9 | |
| 5 | 2C6 | DATE 01/01/00 (SAT) |
| 6 | 4F9 | |
| 7 | 4F6 | |
| 8 | 245 | PUSH CLEAR TO CORRECT |
| 9 | 48 | PUSH PROGRAM TO QUIT |
| 10 | 4F9 | |

FIG. 9

| LINE NO. | LINE ROM ADR | |
|---|---|---|
| 1 | 4E1 | TIMER SETTING NO. 3 |
| 2 | 304 | MODE NORMAL |
| 3 | 192 | START 02/20 (TUE) |
| 4 | 54E | TIME 08:35 PM |
| 5 | 1D8 | END TIME 09:40 PM |
| 6 | 17B | CHANNEL 25 SPEED EP |
| 7 | 4F6 | |
| 8 | 245 | PUSH NUMBER TO SELECT |
| 9 | 48 | PUSH PROGRAM TO QUIT |
| 10 | 352 | |

FIG. 10

| LINE NO. | LINE ROM ADR | |
|---|---|---|
| 1 | 402 | CLOCK SETTING |
| 2 | 4F9 | |
| 3 | 54E | TIME 12:20 -- |
| 4 | 4F9 | |
| 5 | 2C6 | DATE 01/01/00 |
| 6 | 4F9 | |
| 7 | 27A | AM=1 PM=2 |
| 8 | 245 | PUSH CLEAR TO CORRECT |
| 9 | 48 | PUSH PROGRAM TO QUIT |
| 10 | 4F9 | |

FIG. 11

| LINE NO. | LINE ROM ADR | |
|---|---|---|
| 1 | 4E1 | TIMER SETTING NO. 3 |
| 2 | 304 | MODE NORMAL |
| 3 | 192 | START 02/20 (TUE) |
| 4 | 54E | TIME 08:35 PM |
| 5 | 1D8 | END TIME 09:40 PM |
| 6 | 17B | CHANNEL 25 SPEED -- |
| 7 | 28D | SP=1 LP=2 EP=3 |
| 8 | 245 | PUSH NUMBER TO SELECT |
| 9 | 48 | PUSH PROGRAM TO QUIT |
| 10 | 352 | 02/11 (SUN) 11:20AM |

ON-SCREEN DISPLAY APPARATUS

BACKGROUND OF THE INVENTION

1. Field of the Invention

The present invention relates to an on-screen display apparatus. More specifically, the present invention relates to an on-screen display apparatus for displaying characters representative of a channel number, a timer reservation time, and etc. on a display screen of a monitor television in a video display apparatus such as a television receiver, a video tape recorder, a video disc player, and etc.

2. Description of the Related Art

In such a kind of on-screen display apparatus, font data of necessary characters are stored in advance in a character memory (ROM), and the font data is sequentially read-out in accordance with designation by an user or a microcomputer. The font data are then converted into a video signal which is then superposed on a television video signal. In a conventional wellknown on-screen display apparatus, addresses of a character memory are one-by-one designated by the microcomputer each character such that the font data is read-out from the character memory each character one-by-one.

In a conventional on-screen display apparatus, in a case where a given sentence or character train is to be displayed, on-screen character data of a series of characters which constitute the sentence or character train are written in advance in a ROM of a microcomputer, and the character data is read-out and applied to the character memory each character one-by-one, and therefore, not only a memory capacity of the microcomputer increases but also a burden of the microcomputer for reading-out the character data in a sequential manner is large. Furthermore, the character data are outputted one by one character, and then, an on-screen display is performed at a stage where the character data of all characters for a whole television screen, 12 lines×24 characters, for example, have been written in the display memory. Thus, a speed for the on-screen display is slow and is not synchronized with a key operation by the user. Accordingly, there was a problem in the operability of the apparatus.

SUMMARY OF THE INVENTION

Therefore, a principal object of the present invention is to provide an on-screen display apparatus in which it is possible to reduce a burden of a microcomputer or a CPU.

Another object of the present invention is to provide an on-screen display apparatus capable of increasing display speed.

In brief, the present invention is an on-screen display apparatus in which font data of each character is read-out from a character memory for display on a display screen of a monitor, comprising: a line memory for fixedly storing character data of a plurality of character wherein at least one of the plurality of character trains, includes at least one specific character representative of at least one variable character trains each of which is composed of a series of characters; address designating means for designating an address of line memory in which character data of a head character constituting character train is stored; position data generating means for generating position data of a position on the display screen; first reading means for reading-out the font data of a series of characters from character memory on the basis of position data from position data generating means and address designated by address designating means; and converting means for converting font data into a video signal.

In the character memory, the font data of necessary characters are stored in advance. In addition, the plurality of character trains are stored in the line memory in advance, and each of the character trains includes a plurality of successive characters. The character data being stored in the line memory is the address of the character memory in which the font data of that character is stored. When a given character train is to be on-screen displayed, a microcomputer or CPU stores an address of the line memory in which the character data of the head character of the character train is stored in a display memory (RAM) through a control bus, for example. An H position counter and a V position counter constituting the position data generating means generate the position data of a position on the monitor display screen. Since in the line memory, it is possible to recognize the font data are to be read-out at what timings on the basis of the position data, the character data are sequentially read-out at that timings from the head address of the line memory, and therefore, the font data of the series of characters constituting the above described character train are sequentially and automatically read-out from the character memory. Then, the font data are applied to the video signal outputting circuit so as to be converted into the video signal.

According to the present invention, a character train composed of a series of characters can be on-screen displayed only by designating a head address of the line memory by a microcomputer or CPU, and therefore, in comparison with a conventional apparatus in which a microcomputer designates addresses of the line memory each character one-by-one, a burden of the microcomputer or CPU can be drastically reduced. Furthermore, only the data representative of the head address may be stored in the memory of the microcomputer, and therefore, it is possible to reduce a memory capacitor thereof. Furthermore, since a series of characters are sequentially and automatically on-screen displayed only by designating the head address by the microcomputer or the like, a display speed can be made rapid.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing one example of a memory map of a display RAM shown in FIG. 1;

FIG. 3 is an illustrative view showing a portion of a line ROM shown in FIG. 1;

FIG. 4 is an illustrative view showing another portion of the line ROM shown in FIG. 1;

FIG. 7 is an illustrative view showing a menu screen;

FIG. 8 is an illustrative view showing a time setting screen;

FIG. 9 is an illustrative view showing a timer reservation time setting screen;

FIG. 10 is an illustrative view showing the time setting screen as changed from FIG. 8; and FIG. 11 is an illustrative view showing the timer reservation time setting screen as changed from FIG. 9.

DETAILED DESCRIPTION OF THE PREFERRED EMBODIMENT

Figure 1:
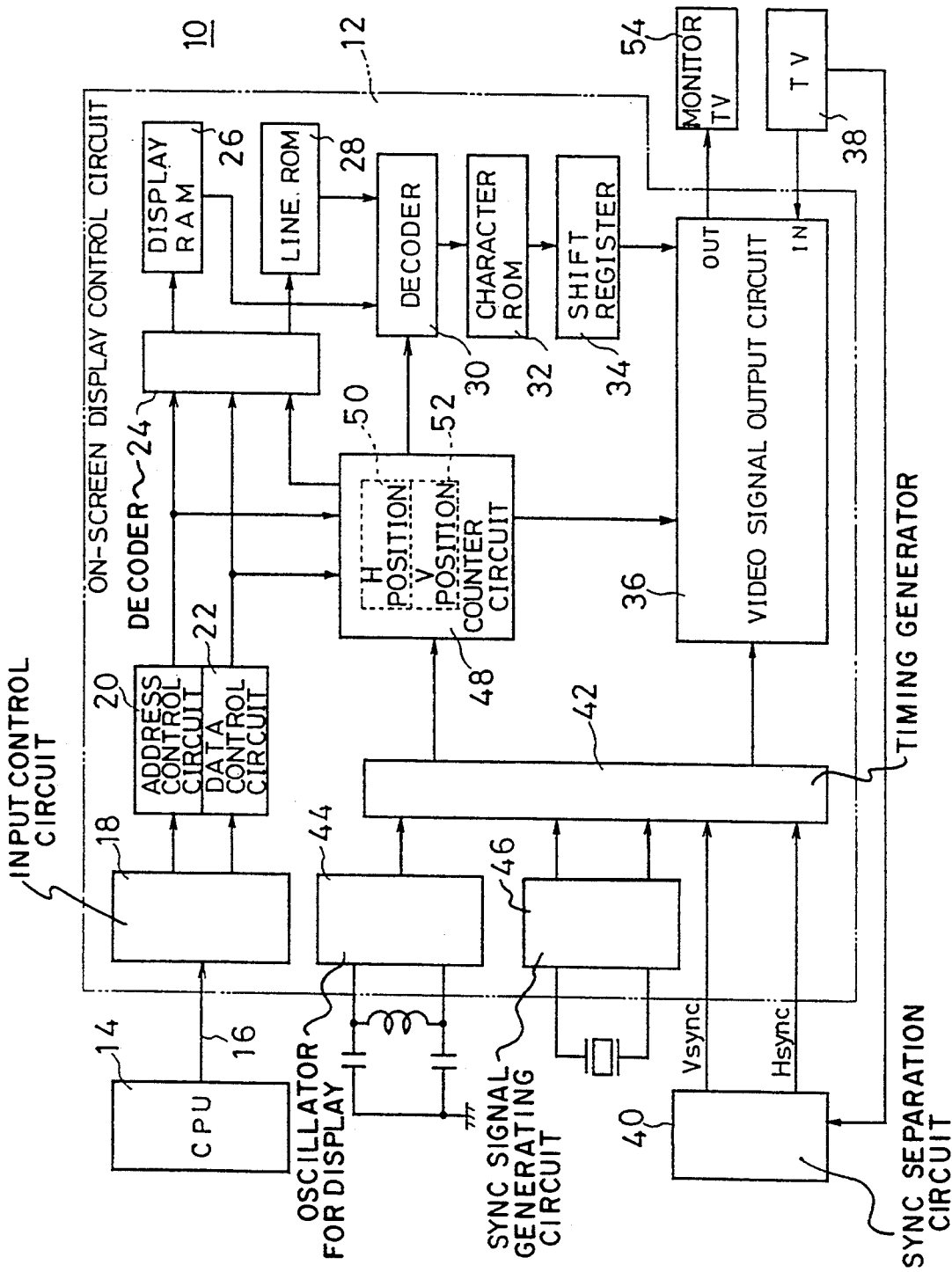
FIG. 1 is a block diagram showing a preferred embodiment according to the present invention.

An on-screen display apparatus 10 shown in FIG. 1 includes an on-screen display control circuit 12 which is constructed by a chip such as an integrated circuit "LC7470" manufactured by the same assignee of the present invention, for example. Control signals or control data are given to the on-screen display control circuit 12 from a CPU 14 via a control bus 16. More specifically, the control bus is a 3-wire serial bus, and SIN (serial data input), CS (chip select signal) and SCLK are applied to an input control circuit 18. As the SIN, an address of 8 bits is precedingly inputted, and the address is followed by data of 16 bits, for example. Then, the chip select signal is an active low signal designating a period of the data, and the SCLK is a clock.

The input control circuit 18 converts the address and the data included in the serial data input SIN into bit parallel data so as to apply to an address control circuit 20 and data control circuit 22, respectively. For example, if only one data follows the address when the address is "1", the address "1" is applied to the address control circuit 20 as it is. However, if a plurality of data follows one address, the input control circuit 18 applies addresses sequentially incremented to the address control circuit 20 with respect to the data on and after second data. The address control circuit 20 designates addresses of a display RAM 26, and the data control circuit 22 writes a variable character code, a line ROM address or a display control code in the display RAM 26. More specifically, a decoder 24 writes the data from the data control circuit 22 in the display RAM 26 according to the address from the address control circuit 20, and outputs the bit parallel data which directs to read-out the data from a line ROM 28.

The display RAM 26 has a memory configuration as shown in FIG. 2, and addresses "000h–0AFh" constitute a display memory area, and addresses "0B0h–0BBh" constitute an address storing area for designating the addresses of the line ROM 28, and addresses "0B0h–0BBh" constitute a control area for storing display control data. In the display memory area, character data of a variable character which is designated by the CPU 14 according to the designation by an user is written in data bits DA0–DA6. For example, the variable character is a variable included in a fixed sentence such as a timer reservation time, channel number, or the like. The display RAM 26 is read-out on the basis of the parallel data applied to the decoder 24; however, if it is instructed by the line ROM that the variable or variable character is included in the sentence, the character data of the data bits DA0–DA6 is read-out.

In the line ROM 28, character codes shown in FIG. 3 and FIG. 4 are fixedly stored in advance. More specifically, the line ROM 28 includes addresses of "000h–5FFh" and character codes (addresses of a character ROM 32) of the characters for one line on the screen of a monitor television 54 are written in a series of addresses. In addition, head addresses of respective series of addresses are meshed in FIG. 3 and FIG. 4. For example, in addresses "000h–017H", a sentence of "PUSH□ NUMBER□ TO □ SELECT□ □ □" is stored. In this case, the head address is "000h", and a symbol "□" is representative of a character space. Thus, by designating the head address of the series of addresses, the character codes of the characters for 24 characters to be displayed in one line are read-out from the line ROM 28 automatically.

Furthermore, in addresses "54Eh–557h", a sentence of "□ □ □ □ □ TIME□ ??:??□ ??□" is stored. In this case, the head address is "54Eh" and a symbol "?" is representing that the aforementioned variable or variable character is to be displayed in that portion. When the symbol "?" is stored in the line ROM 28, as an address of the character ROM 32, the character code stored in the display RAM 26 is applied to the decoder 30 as it is. More specifically, since a flag which represents that the data to be referred to is stored in the line ROM 28 or the display RAM 26 is set as "1" in the position of the symbol "?", the decoder 30 reads the data from the display RAM 26 at that position and applies the same to the character ROM 32. However, if successive symbols "?" are to be displayed, the variables or variable characters for the number of the symbols "?" are written in successive addresses of the display RAM 26 by the CPU 14 according to the operation of the user. Then, since the address of the display RAM 26 is automatically incremented by the decoder 30, character codes of two variables or variable characters, for example represented by "??" are sequentially read-out from the display RAM 26. That is, the decoder 30 reads the font data of the character from the character ROM 32 according to the character code of the variable character from the display RAM 26 or the character code from the line ROM 28.

In addition, in the line ROM 28, as shown in FIG. 3 and FIG. 4, if an end portion of a given line and a beginning portion of a next line include the same word (character) or character spacer that portion can be commonly used for both of a preceding line and a succeeding liner and therefore, a capacity of the line ROM 28 can be reduced. Furthermore, in the line ROM 28, a series of addresses of the character ROM 32 are stored so as to display a sentence of "French", "Spanish" and so on other than "English", and therefore, it is possible to on-screen display the sentence of any one of the languages as necessary. However, if there is a sentence to be used commonly for the respective languages, it is possible to design that such the sentence is commonly used so as to reduce a memory capacity.

Figures 5, 6:
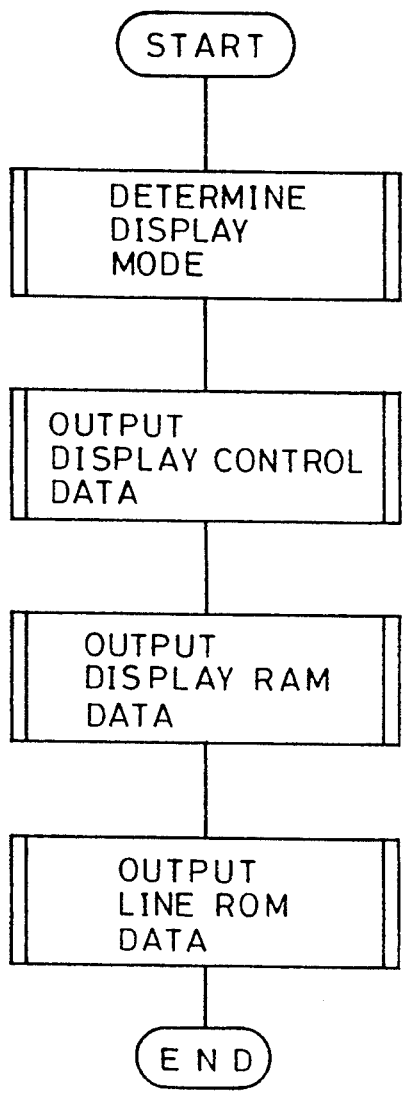
FIG. 5 is an illustrative view showing one example of a character ROM shown in FIG. 1.
FIG. 6 is a flowchart showing an operation of the preferred embodiment shown in FIG. 1.

As shown in FIG. 5, in the character ROM 32, font data of respective characters are fixedly stored in respective addresses. Then, the font data outputted from the character ROM 32 is converted into bit serial data by a shift register 34 to be applied to a video signal output circuit 36. The video signal output circuit 36 receives a video signal from an external video signal generating circuit such as a television 38, and therefore, in the video signal output circuit 36, a video signal according to the font data for on-screen display outputted from the shift register 34 is superposed on the video signal from the television and a superposed video signal is applied to the monitor television 54.

A composite video signal from the television 38 is further applied to a synchronization signal separating circuit 40. The synchronization signal separating circuit 40 separates a vertical synchronization signal Vsync and a horizontal synchronization signal Hsync from the composite video signal and applies the same to a timing generator 42. The timing generator 42 further receives a dot clock from an oscillation circuit for display 44 and a synchronization clock from a synchronization signal generating circuit 46. Then, the synchronization signals Vsync and Hsync and the dot clock are outputted from the timing generator 42. A counter circuit 48 includes an H position counter 50 and a V position counter 52, and the H position counter 50 is reset by the horizontal synchronization signal Hsync, and counts the dot clock so as to output an H position data representative of a position within one line (24 characters). As similar thereto, the V position counter 52 is reset by the vertical synchronization signal Vsync, and counts the horizontal synchronization signal Hsync so as to output a V position data representative of a position within 12 lines. The H position data and V position data are applied to the decoders 24 and 30, respectively, as pointers therefor.

In the decoder 24, with reference to upper bits of the position data outputted from the counter circuit 48, that is, upper bits of the H position data and the V position data, it is possible to detect that the display position on the screen of the monitor television 54 is corresponding to any one of 12 lines and corresponding to any one of 24 characters. Therefore, the decoder 24 can recognize a row address of the display RAM 26. Then, the data of the head address of the line ROM 28 being stored in that row address is read-out. On the other hand, the H position data from the H position counter 50 is applied to the line ROM 28 via the decoder 24. Therefore, from the line ROM 28, the address of the character ROM 32 of corresponding character within one line (24 characters) is applied to the decoder 30 on the basis of the H position data and the head address read-out from the display RAM 26.

An operation of FIG. 1 embodiment is schematically shown in FIG. 6. In brief, at first, a display mode is decided. As the display mode, mode 0 (no display), mode 1 (menu shown in FIG. 7), mode 2 (time setting shown in FIG. 8), mode 3 (reservation time setting shown in FIG. 9), and etc. can be considered. Then, the CPU 14 outputs the display control data. That is, the CPU 14 writes the control data for controlling a display position, character size, period for flashing, and etc. in the control area of the display RAM 26 shown in FIG. 2 through the control bus 16. Next, the data of the display RAM 26 is outputted. It is assumed that the number of variables or variable characters is constant in the above described four modes. For example, in the modes 0 and 1 the number of variables is "0", and in the mode 2 the number of variables is "18", and in the mode 3 the number of variable is "46".

In the mode 2, if a screen shown in FIG. 8 is changed to a screen shown in FIG. 10, the 7th line is changed from a state where the 7th line includes no characters to a state where the same includes 3 variable characters. Therefore, if the screen of FIG. 8 is to be display, a sentence beginning at the head address 4F6h" of the line ROM 28 is assigned. With reference to FIG. 4, the sentence beginning at the head address "4F6h" is "???☐ ☐☐☐☐☐☐☐☐☐☐☐", and therefore, it includes 3 variables or variable characters. Therefore, when the screen shown in FIG. 10 is to be displayed, the character data of the character space may be written in the display RAM 26 so that the character spaces can be displayed at the portions of the symbols "?". Then, in the case where the screen shown in FIG. 10 is to be displayed, the character data of the variable character may be written in the same address of the display RAM 26, so that no transitional flicker occurs in displaying the screen shown in FIG. 10. However, in FIG. 7 to FIG. 10, for the line in which no characters is to be displayed, a sentence "☐☐☐☐☐☐☐☐☐☐☐☐ ☐☐☐☐☐☐☐☐☐" beginning at an address "4F9h" of the line ROM 28 is assigned (see FIG. 4).

In the mode 3, if the screen shown in FIG. 9 is changed to the screen shown in FIG. 11, a process similar to the above described process is performed because the number of variable characters in the 7th line is changed. If such a process is performed, the addresses of the display RAM 26 for a current time and a data being displayed in the 10th line in FIG. 11 are not changed. That is, the 34th character to the 46th character are unchanged. Therefore, even if the screen of FIG. 9 is to be changed to the screen of FIG. 11, no flicker occurs in the display in a transitional state since the addresses of the display RAM 26 are not changed.

Lastly, according to the respective display modes and displaying states, the head address of the line ROM 28 is designated, and the addresses of the character ROM 32 storing the characters constituting a series of sentence in each line are read-out from the line ROM 28, whereby each font data is read-out from the character ROM 32.

An operation of a case where a sentence "CLOCK SETTING" shown in FIG. 8 is to be on-screen displayed will be described concretely. At first, in this case, no variable or variable character included, the CPU 14 inputs a head address "402" of a series of addresses storing character codes of characters which constitute the sentence "CLOCK SETTING" to the on-screen display control circuit 12. This address data is stored in the 1st line of the ROM address area within the display RAM 26 by the input control circuit 18, the address control circuit 20 and the data control circuit 22.

Next, if a code instructing on-screen display is transferred from the CPU 14, the decoder 30 reads the character codes from the series of the addresses of the line ROM 28 such that the font data from the character ROM 30 is read-out at timings when respective characters can be displayed at respective corresponding display positions represented by the position data from the counter circuit 48. For example at a timing of the 1st character of the 1st line, an address "102h" (see FIG. 5) of the character ROM 30 in which the font data of the character "C" is read-out from the above described head address "402" of the line ROM 28. At a timing of the 2nd character, the decoder 30 reads an address "10Bh" (see FIG. 5) of the character ROM 30 in which the font data of the character "L" is stored from the succeeding address "403" of the line ROM 28, and so forth on.

In a case where a sentence "TIME 12:00AM" shown in the 3rd line in FIG. 8 is to be on-screen displayed, since this sentence includes variables or variable characters, the CPU 14 stores addresses of the character ROM 30 representative of the variable characters "1200AM" in a buffer (not shown) for each character. Then, a head address "54Eh" of a series of addresses in which the character codes of the characters constituting the sentence "TIME 12:00AM" is inputted to the on-screen display control circuit 12 from the CPU 14 via the control bus 16. This address data is stored in the 3rd line of the ROM address area within the display RAM 26 by the input control circuit 18, the address control circuit 20 and the data control circuit 22. Then, the CPU 14 sequentially transfers the character codes of the variable characters in a manner similar to the above described manner. The character codes are stored in the display memory area of the display RAM 26. Therefore, the address train of the character ROM 30 that represents "1200AM" is stored in the display RAM 26.

Next, if a code instructing to on-screen display is transferred from the CPU 14, the decoder 30 reads the character codes from the series of addresses of the line ROM 28 such that the font data are read-out from the character ROM 30 at timings when the respective characters can be displayed at respective corresponding display positions represented by the position data from the counter circuit 48. For example, at a timing of the 1st character of the 3rd line, the symbol "□" of the above described head address "54Eh" of the line ROM 28 is referred. Because the symbol "□" is representative of the character space, no font data is outputted from the character ROM 32. Such a state will be continued until the 5th character, and the font data of "TIME" are sequentially outputted from the 6th character to the 9th character. Since the 11th character is the variable "1", the decoder 24 detects a timing thereof, and reads an address "001h" of the character ROM 32 storing the font data of "1" which is stored in the display RAM 26 as described above, and applies the address "001h" to the decoder 30. Therefore, the decoder 30 reads the font data of "1" from the character ROM 32 as similar to a case where the address is given from the line ROM, and so forth on. In addition, by referring the symbol "?", it is possible to recognize the standing of the variable or variable character being currently read-out.

In addition, as described above, the 7th line shown in FIG. 9 is a line including no character; however, the head address "4F6h" of the line ROM 28 is designated. In the sentence beginning at the head address includes three variable symbols "?", but, the symbols are used as dummy symbols in that case. Therefore, the CPU 14 writes a character code representative of a character space in the display RAM 26 with respect to each of the dummy symbols "?". Then, since three variables or variable characters are included in the 7th line of the screen shown in FIG. 11, in this case, the CPU 14 writes the character codes of the variables or variable characters in the display RAM 26. The 7th line of FIG. 9 apparently includes three variables or variable characters as similar to the 7th line of FIG. 11, and therefore, the CPU 14 writes the character space or true or necessary variables or variable characters in the same addresses of the display RAM 26, respectively. Accordingly no change occurs in address of display RAM 26, and therefore, no flicker occurs in a transitional timing when the screen is changed from FIG. 9 to FIG. 11.

Although the present invention has been described and illustrated in detail, it is clearly understood that the same is by way of illustration and example only and is not to be taken by way of limitation, the spirit and scope of the present invention being limited only by the terms of the appended claims.

What is claimed is

1. An on-screen display apparatus in which font data of each character is read-out from a character memory for display on a display screen of a monitor, comprising:
   a line memory for fixedly storing character data of a plurality of character trains each of which is composed of a series of characters, wherein at least one of the plurality of character trains includes at least one specific character representative of at least one variable character;
   address designating means for designating an address of said line memory in which character data of a head character constituting said character train is stored;
   position data generating means for generating position data of a position on the display screen;
   first reading means for reading-out the font data of said series of characters from said character memory on the basis of said position data from said position data generating means and said address designated by said address designating means; and
   converting means for converting said font data into a video signal.

2. An on-screen display apparatus according to claim 1, further comprising:
   a display memory for storing character data of said variable character; and
   second reading means for reading-out font data of said variable character from said character memory according to said character data which is read-out from said display memory by referring to the character data of said specific character stored in said line memory.

3. An on-screen display apparatus according to claim 2, wherein said variable character includes a dummy character, and said display memory stores character data representative of a character space in response to said dummy character.

* * * * *